United States Patent
Eckrich et al.

(10) Patent No.: US 8,456,174 B2
(45) Date of Patent: Jun. 4, 2013

(54) METHOD FOR DETERMINING AT LEAST ONE FIRST INTERNAL PARAMETER OF A SENSOR

(75) Inventors: Joerg Eckrich, Wiesbaden (DE); Ralf Klausen, Frankfurt (DE); Timo Dietz, Hochheim am Main (DE); Wolfgang Fritz, Grossen-Linden (DE); Wolfgang Joeckel, Gersfeld (DE)

(73) Assignee: Continental Teves AG & Co. oHG (DE)

( * ) Notice: Subject to any disclaimer, the term of this patent is extended or adjusted under 35 U.S.C. 154(b) by 389 days.

(21) Appl. No.: 12/996,181

(22) PCT Filed: May 29, 2009

(86) PCT No.: PCT/EP2009/056649
§ 371 (c)(1),
(2), (4) Date: Dec. 3, 2010

(87) PCT Pub. No.: WO2009/147107
PCT Pub. Date: Dec. 10, 2009

(65) Prior Publication Data
US 2011/0089930 A1     Apr. 21, 2011

(30) Foreign Application Priority Data
Jun. 6, 2008   (DE) .......................... 10 2008 027 221

(51) Int. Cl.
*G01R 27/02*   (2006.01)
*G01R 19/00*   (2006.01)
*G01R 31/3187* (2006.01)
(52) U.S. Cl.
USPC ..................... 324/609; 324/76.11; 324/750.3

(58) Field of Classification Search
USPC .................. 324/76.77, 76.11, 609, 602, 600, 324/750.3, 537, 500
See application file for complete search history.

(56) References Cited

U.S. PATENT DOCUMENTS

| | | |
|---|---|---|
| 4,902,970 A | 2/1990 | Suquet |
| 5,231,351 A | 7/1993 | Kordts et al. |

(Continued)

FOREIGN PATENT DOCUMENTS

| | | |
|---|---|---|
| DE | 40 30 085 | 3/1992 |
| DE | 44 34 978 | 4/1996 |

(Continued)

OTHER PUBLICATIONS

International Search Report for PCT/EP2009/056649 issued Jan. 25, 2010.
German Search Report for DE 10 2008 027 221.3 dated, Mar. 19, 2009.

*Primary Examiner* — Hoai-An D Nguyen
(74) *Attorney, Agent, or Firm* — RatnerPrestia

(57) ABSTRACT

A sensor and method for determining at least one internal parameter for an active sensor in a special mode of operation. The sensor has at least one sensor element, an evaluation circuit, at least two connecting lines, and a changeover module. The sensor is changed over between a normal mode of operation and the special mode of operation by means of the changeover module and is put into the special mode of operation for the purpose of determining the at least one internal parameter. The sensor has an electric offset source which is used in the special mode of operation to at least partially actuate the evaluation circuit on the basis of the supply voltage of the sensor which is applied to the two connecting lines such that the at least one internal parameter of the sensor can be ascertained from the sensor output signal.

27 Claims, 7 Drawing Sheets

U.S. PATENT DOCUMENTS

| | | | |
|---|---|---|---|
| 5,477,471 A * | 12/1995 | Baum et al. | 702/88 |
| 6,215,297 B1 | 4/2001 | Bleckmann et al. | |
| 6,504,360 B1 | 1/2003 | Lohberg et al. | |
| 2003/0222637 A1 | 12/2003 | Stauth et al. | |
| 2004/0249544 A1 * | 12/2004 | Lohberg | 701/70 |
| 2010/0277224 A1 | 11/2010 | Joeckel et al. | |

FOREIGN PATENT DOCUMENTS

| | | |
|---|---|---|
| DE | 102 03 483 | 11/2002 |
| DE | 10 2007 026786 | 4/2008 |

* cited by examiner

METHOD FOR DETERMINING AT LEAST ONE FIRST INTERNAL PARAMETER OF A SENSOR

CROSS REFERENCE TO RELATED APPLICATIONS

This application is the U.S. national phase application of PCT International Application No. PCT/EP2009/056649, filed May 29, 2009, which claims priority to German Patent Application No. DE 10 2008 027 221.3 filed Jun. 6, 2008, the contents of such applications being incorporated herein by reference.

FIELD OF THE INVENTION

The invention relates to a method for determining at least one first internal parameter for a sensor, to a sensor and to the use of the sensor in motor vehicles.

BACKGROUND OF THE INVENTION

Document DE 44 34 978 A1, which is incorporated by reference, describes an active sensor with a two-wire interface which has a test mode for capturing a critical air gap length between sensor and encoder, wherein it is possible to change over between the normal mode of operation and this test mode by altering the operating voltage by virtue of the sensor being actuated with a serial voltage bit pattern.

Document DE 102 03 483 A1, which is incorporated by reference, proposes a wheel speed sensor which can be operated in different modes or has different modes of data transmission, wherein it is possible to change over between these modes of operation by means of external actuation using an additional input.

SUMMARY OF THE INVENTION

An object of the invention is to provide a method for determining an internal parameter for an active sensor and also an active sensor which is used in a relatively reliable and simple manner to ascertain at least one first internal parameter for the sensor in a special mode of operation.

The invention relates to the concept of proposing a sensor and a method for determining at least one first internal parameter for a sensor, wherein the sensor has an electric offset source. This electric offset source is used, possibly in a special mode of operation, to actuate an evaluation circuit directly or indirectly such that the first internal parameter of the sensor can be determined.

The sensor according to aspects of the invention and the method according to aspects of the invention have advantages such as the at least first internal parameter of the sensor can be ascertained or calculated in a special mode of operation or test mode in a relatively simple manner in an installed state of the sensor, for example as a wheel speed sensor in a motor vehicle, wherein the sensor is additionally overmolded with a plastic package. In this context, it is possible to determine the signal amplitude of a sensor element differential signal or the sensor element differential signal, for example, wherein this internal parameter is used or can be used to calculate the installation position of the sensor, in some embodiments with regard to the air gap length between sensor and an associated encoder. Alternatively, it is a relatively simple matter to determine a signal offset for the sensor element or an offset for a measurement bridge of the sensor element.

A sensor element is preferably understood to mean a magnetic field sensor element which operates on the basis of the Hall effect or one of the various magnetoresistive effects, such as the anisotropic magnetoresistive effect.

The sensor element comprises a full bridge comprising magnetoresistive, sensitive structures or segments and produces at least two sensor element output signals, which are associated with the two bridge components of the sensor element, over the course of a captured magnetic field, in some embodiments, specifically a changing magnetic field produced and/or modulated by a magnetic encoder.

The sensor can be operated at least in a normal mode of operation and in a special mode of operation. These modes of operation preferably have further submodes of operation. The sensor comprises changeover means which can be used to change the association between supplementary information and defined transmission channels for the sensor output signal by changing over between submodes of operation, with preference in the manner of a sensor arrangement or an appropriate exemplary embodiment based on document DE 102 03 483 A1. In another preferred embodiment, submodes of operation are changed over on the basis of the operating state of the sensor and/or on the basis of defined parameters which, with preference, are captured by the sensor.

A normal mode of operation of the sensor is understood to mean the operation in which the at least one intended measured variable is captured by the sensor and processed and, in some embodiments, essentially without interference, provided as a direct or indirect measured value, contained in a sensor output signal.

It is preferred for the sensor to continue to measure in the special mode of operation and to provide an appropriate sensor output signal.

Preferably, the output signal from the sensor is transmitted to an electronic control unit, such as in an electronic control unit in a motor vehicle regulatory system.

The sensor may be designed such that the mode of operation is changed over automatically, for example on the basis of actuation on the connecting lines.

The method is preferably developed further by virtue of the evaluation circuit comprising at least one first comparator element, the inputs of which have at least one first internal signal and a second internal signal applied to them which have the information from the first internal parameter, wherein an offset signal produced by the electric offset source is overlaid on at least one of these two internal signals, after which the at least one internal parameter of the sensor is determined directly or indirectly at least from the output signal of the first comparator element. In this case, the first internal signal may be a first sensor element output signal and the second internal signal is a second sensor element output signal or a reference signal, wherein the offset source is actuated such that the value of the offset signal produced by this offset source is varied in a defined manner, preferably continually and/or triangularly, or is set to a defined value, as a result of which the first internal parameter of the sensor is determined directly or indirectly at least from the time profile and/or the value of the output signal of the first comparator element.

The first internal parameter ascertained for the sensor is preferably the signal amplitude of a sensor element differential signal or the value of an internal differential signal or a signal offset for the sensor element, for at least two sensor element components or a sensor element output signal in relation to a reference signal. In some embodiments, at least one of the above parameters is determined as an additional, second internal parameter. Preferably, further internal parameters are also determined.

The sensor is preferably in the form of an active sensor and has at least two connecting lines, in some embodiments with a respective connection, wherein the supply voltage for the sensor which is applied to the two connecting lines is taken as a basis for actuating the electric offset source such that the signal amplitude of a sensor element differential signal or a signal offset for the sensor element is ascertained or calculated from a sensor output signal and/or from the supply voltage applied to the two connecting lines in an electronic control unit which is connected to the two connecting lines of the sensor. It is preferred for the sensor to be put into the special mode of operation or changed over between the modes of operation by reversing the polarity of the supply voltage for the sensor which is applied to the two connecting lines. In the normal mode of operation or in normal operation of the sensor, the supply voltage is in this regard preferably connected thereto with the envisaged polarity, that is to say "+" to "+" and "−" to "−". In some embodiments the normal mode of operation of the sensor is preferably defined by virtue of a defined minimum supply voltage being available to the sensor.

The first and second internal signals are preferably supplied to an additional second comparator element. Thereafter, the output signals of the first and second comparator elements are taken into account jointly for determining at least the first internal parameter.

It is preferred for the first and second sensor element output signals or the first sensor element output signal and the reference signal to be supplied to the first comparator element and for the first and second sensor element output signals or the second sensor element output signal and the reference signal to be supplied to the second comparator element. In this case, the values of the two signals supplied to the respective comparator element are respectively compared with one another directly or indirectly, with the offset signal produced by the offset source being overlaid on a respective one of the supplied signals at an input of the first comparator element and at an input of the second comparator element.

In order to ascertain a signal offset for the sensor element, the offset signal produced by the offset source is preferably varied until the first comparator element switches twice or the first and second comparator elements each switch at least once, after which the offset of the sensor element is determined directly or indirectly from the values of the offset signal at these switching times and/or from the time interval for the successive switching operations of one or both comparator elements and/or from the change in the offset signal value over time. Preferably, the offset signal on an individual comparator element is amplified for a defined time and attenuated for a defined time, with a potential switching hysteresis for this comparator element being preferably taken into account in this case and at the same time the value of a hysteresis threshold additionally being able to be calculated. When a first and a second comparator element are used, the respective offset signal is varied such that the one switching operation of the respective comparator element does not involve a potential switching hysteresis, that is to say that, the offset signal is either amplified or attenuated. As an alternative preference, the offset signal is varied such that the one switching operation of the respective comparator element involves a switching hysteresis becoming active, as a result of which the value of a hysteresis threshold can additionally be calculated.

For the purpose of ascertaining the sensor element differential signal, the movement of an encoder is captured by the sensor element, wherein the time profile of the signal amplitudes or signal values of the first and/or second sensor element output signal is respectively dependent on the relative speed of movement of the encoder in relation to the sensor and, in some embodiments with periodic alternation, the signal amplitude of one sensor element output signal is larger than the signal amplitude of the other sensor element output signal, and wherein the offset signal produced by the offset source is varied or is set in a defined manner. Preferably, the offset signal is varied, in some embodiments continually, until the output signal of the first and/or of another comparator element remains constant or the first and/or the second comparator element starts and/or stops switching, or that the offset signal produced by the offset source is varied within a defined value range. Thereafter, the sensor element differential signal is calculated at least on the basis of the value of the offset signal at which the first and/or the second comparator element starts and/or stops switching. Preferably, the sensor element differential signal is calculated at least on the basis of at least two values of the offset signal at which the first and/or the second comparator element starts and/or stops switching, as a result of which a possible switching hysteresis for the at least one comparator element is not included in the calculation of the sensor element differential signal, at least in the case of an essentially symmetrical hysteresis. In the case of two switching operations which do not exhibit hysteresis, the determination of the sensor element differential signal is not dependent on a hysteresis of the comparator elements. If the two switching operations each exhibit a hysteresis, but one which has the same value in each case, this hysteresis is not relevant for calculating the sensor element differential signal. The determination of the sensor element differential signal when capturing encoder movements allows the air gap between encoder and sensor to be determined or calculated. As a result, the relative installation position relative to one another can be determined and it can be established whether the air gap is small enough and hence still has a defined air gap reserve. This information is important for assessing operability and functional reliability for wheel speed recording systems in motor vehicles.

It is preferred for first of all the signal offset of the sensor element to be ascertained as first internal parameter and then the sensor element differential signal, with the signal offset of the sensor element being taken into account over the course of the calculation of the sensor element differential signal.

Expediently, a peak-to-peak value for the sensor element differential signal is ascertained, for instance if the sensor element differential signal relates to two sensor element output signals which have been phase shifted through essentially 180° with respect to one another and which preferably have essentially the same amplitude.

The evaluation circuit of the sensor preferably has at least one first comparator element, the inputs of which have at least one first and second internal signal applied to them, when these internal signals have the information from the at least one internal parameter and when the line for one of these internal signals is connected directly or indirectly to the electric offset source. In this case, the first internal signal is a sensor element output signal and the second internal signal is a reference signal or a second sensor element output signal.

The offset source may be connected to the evaluation circuit by means of the changeover module.

The sensor preferably has at least two connecting lines and is supplied with electric power via these connecting lines, wherein the sensor has a voltage supply regulation unit which provides a supply voltage regulated to a defined voltage value, and at least the sensor element and at least portions of the evaluation circuit are connected to this voltage supply regulation unit.

The changeover module preferably comprises a switch which can be used to connect the electric offset source to the evaluation circuit or to at least one portion of the evaluation circuit or to isolate it therefrom. In some embodiments, the changeover module is connected to the two connecting lines of the sensor to which the supply voltage for the sensor is applied. Preferably, the changeover module has a rectifier circuit, such as a bridge rectifier circuit, which is formed from four MOSFETs in order to avoid the voltage drop which occurs in the case of diodes. The input of the rectifier circuit is connected to the two connecting lines of the sensor. The outputs of the rectifier circuit always provide a rectified voltage—even after the polarity of the supply voltage has been reversed—which is used as a supply voltage for at least certain components of the sensor which need to avoid having the polarity of their supply voltage reversed. The rectifier circuit additionally has the action of a general polarity reversal protection element.

The at least two modes of operation and the changeover thereof by means of reversing the polarity of the supply voltage allows the sensor to be used to implement both an undervoltage recognition circuit and a test mode. The actuation of the sensor for changing over the mode of operation by means of reversing the polarity of the supply voltage is reliably recognizable and simple actuation. The risk of this type of actuation being performed involuntarily, for example as a result of injection of an interference signal, during operation is low.

The changeover module expediently has at least one mode comparator for identifying the polarity of the supply voltage for the sensor, wherein the mode comparator is connected, for instance on the input side, to the two connecting lines of the sensor directly or indirectly, preferably by means of a voltage divider. As an alternative preference, the mode comparator senses the supply voltage for the sensor by virtue of the voltage drop across a rectifier component, such as across a diode or a transistor in the bridge rectifier circuit, being sensed.

The power supply connections of the mode comparator and/or of the evaluation circuit are preferably connected to the output connections of the rectifier circuit, as a result of which the supply of power to the above components is made independent of the polarity of the sensor supply voltage.

It is preferred for the changeover module to have a switching device, such as in the form of a switch, for changing over the mode of operation, which switching device takes the output of the first comparator circuit for identifying the polarity of the supply voltage for the sensor and takes the output or the outputs of the at least one reset device as a basis for changing over the mode of operation of the sensor. As a result, the evaluation circuit can be actuated either on the basis of the polarity of the sensor or on the basis of the supply voltage amplitude and an internal mode of operation or submode of operation can be set.

The evaluation circuit preferably comprises at least two comparator elements, wherein the electric offset source is connected to a respective one of the inputs of each of the comparator elements via the changeover module. In some embodiments, the evaluation circuit has two hysteresis circuits in which a first and a second sensor element output signal of the at least one sensor element or alternatively other internal signals are processed, wherein these two hysteresis circuits are connected in parallel and the first hysteresis circuit comprises the first comparator element and the second hysteresis circuit comprises the second comparator element, wherein the inputs of the first and second comparator elements have the first sensor element output signal and the second sensor element output signal or one of the two sensor element output signals and a reference signal applied to them and wherein the input signals of the first and second comparator elements are applied the other way around in respect of the noninverting and the inverting input, and a respective input of the respective comparator element, for example the noninverting input, is linked to the electric offset source via the changeover module.

The evaluation circuit preferably comprises an interface circuit for setting a defined output signal of the sensor, wherein this interface circuit is actuated on the basis of the respective mode of operation.

It is preferred for the output of at least the first comparator element to be connected to a digital output circuit which comprises at least one current source and produces the sensor output signal as a digital current signal.

The evaluation circuit expediently has at least one first selection element which is in the form of a switch, such as wherein this first selection element is in a form and connected such that it can connect together at least two input signal lines of the evaluation circuit or two internal signal lines at two defined points within the evaluation circuit and that this allows the value or the signal offset of an internal differential signal to be determined, at least on the basis of the portions of the evaluation circuit which are in the respective signal path between the first selection element and first comparator element.

The method for determining the at least one internal parameter is preferably extended by virtue of the signal amplitude of a sensor element differential output signal, which corresponds to a differential signal from a first sensor element output signal of a first sensor element component and a second sensor element output signal of a second sensor element component or to a differential signal for appropriately amplified signals, wherein the two sensor element components may be bridge components of a magnetic field sensor element in the form of a full bridge, or by virtue of an offset from sensor element components of the sensor element or from the sensor element itself being ascertained or calculated from the time profile of the sensor output signal in an electronic control unit which is connected to the two connecting lines of the sensor. Preferably, a first and a second sensor element output signal is respectively supplied to a first and a second comparator of the evaluation circuit, with the signal amplitude of these signals respectively being compared with one another directly or indirectly and with an offset signal respectively being overlaid on one of these sensor element output signals at an input of the first comparator and at an input of the second comparator, which offset signal is produced by the electric offset source. In another preferable embodiment, in order to ascertain the sensor element differential signal, the movement of an encoder, such as a magnetic encoder, is sensed by the sensor element. In this case, the time profile of the signal amplitudes of the first and second sensor element output signals is respectively dependent on the relative speed of movement of the encoder in relation to the sensor. In this context, these two signal amplitudes are, with periodic alternation, larger or smaller than the other, that is to say one is larger than the other for a defined time interval, and vice versa. The supply voltage for the sensor which is applied to the two connecting lines of the sensor is now varied or is now set in a defined manner, as a result of which the amplitude of the at least one offset signal produced by the offset source is varied or is set in a defined manner on the basis of this supply voltage.

The first internal parameter and/or further internal parameters is/are preferably calculated at least to some extent in an electronic control unit connected to the sensor. As an alternative preference, these calculations are performed in the evaluation circuit of the sensor.

The evaluation circuit preferably has an amplifier circuit, such as an instrument amplifier unit, which amplifies at least the first and the second sensor element output signal.

A sensor element output signal is understood to mean either the as yet unamplified sensor element output signal or alternatively the already amplified sensor element output signal.

A reference signal understood to mean a DC signal, the voltage value of which may be chosen to be the same as a zero point potential for a ground potential.

The at least one offset signal, as an output signal of the electric offset source, preferably has a value, such as a current and/or voltage value, which is proportional to the supply voltage for the sensor.

The electric offset source is preferably in the form of a voltage-controlled electric source, which may be in the form of a voltage-controlled current source, which produces or provides one or more, preferably homogenous, current signals having a defined current amplitude.

It is preferred for the sensor to be a wheel speed sensor and to be designed accordingly.

It is expedient for the sensor to be at least to some extent in the form of an integrated circuit, such as in the form of an ASIC.

Preferably, the complete sensor, or even certain portions such as the sensor elements and/or the evaluation circuit and the changeover module, is integrated on one chip.

The sensor may have two connecting lines and is connected to an external electronic control unit such as by means of precisely two interconnecting lines. The interconnecting lines are connected to the connecting lines in this case. These respective two lines are preferably used to transmit both the electric power for supplying the sensor and the sensor information. Furthermore, the respective two lines may be used to transmit the information relating to a mode changeover for the sensor to the sensor.

The invention also relates to the use of the sensor according to aspects of the invention, such as a wheel speed sensor, in motor vehicles.

The sensor according to aspects of the invention and the method according to aspects of the invention are suitable for use in motor vehicles because the determination of an internal parameter on the basis of the safety-critical requirements needs to be performed with precision. This can be ensured in a relatively simple manner by the sensor and the method.

The sensor according to aspects of the invention is preferably used in safety-critical areas of use, for example in motor vehicles. In this context, it is preferably used to sense linear and/or rotational movements. In another preferred embodiment, a test mode operation for the sensor is used, following the installation of the sensor in the respective sensor arrangement, for example by the manufacturer, in order to be able to assess the installation quality and the air gap reserve. This allows an increase in the operating quality and operational reliability of low cost sensors which have no opportunity for autonomous sensing of the air gap length.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1:
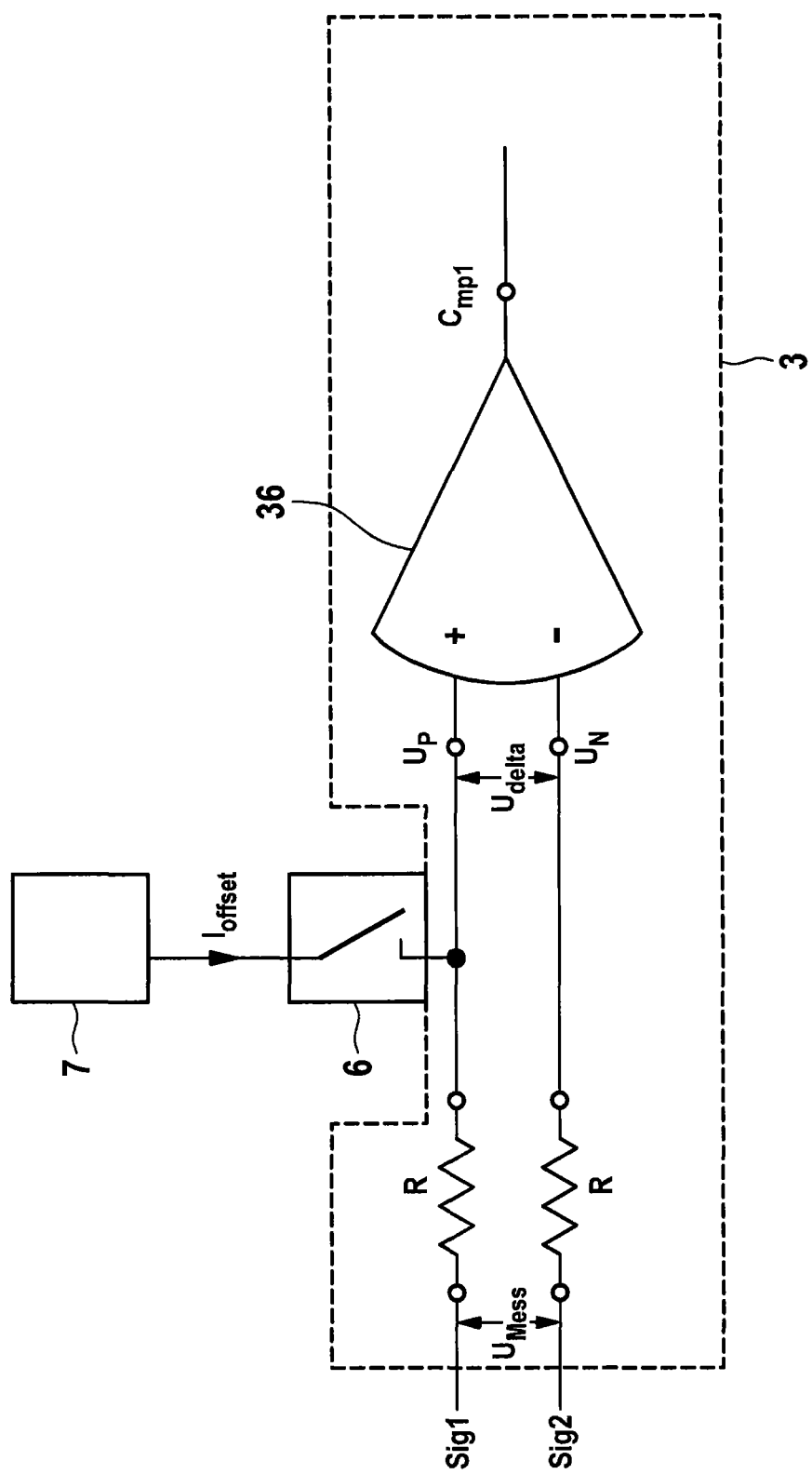
FIG. 1 shows an exemplary evaluation circuit which is actuated by means of a changeover module of an electric offset source.

FIG. 1 shows an exemplary embodiment which comprises an evaluation circuit 3 which is actuated by an electric offset source 7 using a changeover module 6. A first and a second internal signal, in line with the example of a first and a second sensor element output signal Sig1, Sig2, are supplied to a first comparator element 36 via a respective resistor R. The offset source 7 is in the form of a voltage-controlled current source which drives the offset signal $I_{offset}$, which can be overlaid by means of the changeover module 6, on the basis of the mode of operation Sig1.

The sensor element output signals Sig1, Sig2 each have an AC component $U_{AC}$ and a DC component $U_{DC}$. In line with the example, there is a signal offset $U_{Offset}$ between the mean values of both signals. In line with the example, this signal offset is divided symmetrically with respect to the common DC component $U_{DC}$ over Sig1 and Sig2 and can normally be defined accordingly, since in this case there is a purely differential consideration and the absolute value of the DC component is insignificant.

The following equations apply:

$$U_{Sig1} = U_{AC1} + U_{DC} + U_{Offset}/2 \quad (1)$$

$$U_{Sig2} = U_{AC2} + U_{DC} - U_{Offset}/2 \quad (2)$$

In the special mode of operation, $I_{Offset}$ contributes a voltage $I_{Offset}*R$ across R to the voltage $U_P$ at the noninverting input of the first comparator element 36. In this case, in line with the example, it is assumed that the output resistance of the sensor element outputs is very much lower than R and that the input resistance of the comparator element 36 is very much higher than R.

For the input nodes $U_P$, $U_N$ on comparator element 36, the following are accordingly obtained:

$$U_P = U_{Sig1} + I_{Offset}*R = U_{AC1} + U_{DC} + U_{Offset}/2 + I_{Offset}*R \quad (3)$$

$$U_N = U_{Sig2} = U_{AC2} + U_{DC} - U_{Offset}/2 \quad (4)$$

The differential input signal for the comparator element is accordingly obtained as:

$$U_{delta} = U_P - U_N = (U_{AC1} - U_{AC2}) + U_{Offset} + I_{Offset}*R \quad (5)$$

In line with the example, the comparator element 36 is designed to exhibit no hysteresis, as a result of which the switching threshold is obtained as follows:

$$U_{delta} = 0 \Leftrightarrow (U_{AC1} - U_{AC2}) + U_{Offset} + I_{Offset}*R = 0 \quad (6)$$

The signal offset can be ascertained using equation (6). The action of the sensor element on $U_{AC}$ must be prevented in this context, that is to say that, in line with the example, the movement of a magnetic encoder is thus not sensed by the sensor, which means that $U_{AC1}=U_{AC2}=0$. When this is inserted into (6), the following is accordingly obtained:

$$U_{Offset}+I_{Offset}*R=0$$

The comparator output signal Cmp1 thus changes or the comparator element 36 switches when the following applies:

$$U_{Offset}=-I_{Offset}*R \quad (7)$$

Since the offset signal $I_{Offset}$ is produced by the offset source 7 and is accordingly known, the signal offset $U_{Offset}$ can be calculated.

Following the ascertainment of the signal offset, the sensor element differential signal is then ascertained and the known signal offset is taken into account in the process.

On the basis of the already known signal offset, the sensor element output signals are assumed in simplified terms as follows:

$$U_{Sig1}=U_{AC1}+U_{DC}$$

$$U_{Sig2}=U_{AC2}+U_{DC}$$

or the voltages applied to the comparator element 36

$$U_P=U_{AC1}+U_{DC}+I_{Offset}*R$$

$$U_N=U_{AC2}+U_{DC}$$

Equation (6) is thus simplified to:

$$U_{delta}=U_P-U_N=U_{AC1}-U_{AC2}+I_{Offset}*R$$

The comparator element 36 thus switches when the following applies:

$$I_{Offset}*R=U_{AC2}-U_{AC1} \quad (8)$$

Over the course of ascertainment of the sensor element differential signal, the movement of a magnetic encoder is sensed by the sensor element, as a result of which $U_{AC1}$ and $U_{AC2}$ are not equal to zero. Therefore, a periodic change can be observed at the output Cmp1 of the comparator element 36 or the comparator element switches periodically while equation (8) is satisfied.

By way of example the offset signal $I_{Offset}$ is increased or amplified beginning with a value of less than $-|U_{AC2}-U_{AC1}|$, as a result of which the output signal Cmp1 from the comparator element 36 does not switch at first, that is to say remains constant at first. As soon as the condition $I_{Offset}*R>-|U_{AC2}-U_{AC1}|$ is met, the comparator element 36 begins to switch until the condition $I_{Offset}*R>|U_{AC2}-U_{AC1}|$ is met. The range of values of the offset signal $\Delta I_{Offset}$ in which the electric offset source 7 can be varied while a periodic output signal Cmp1 from the comparator element 36 can be observed, or the comparator element 36 is switching, is accordingly obtained as:

$$\Delta I_{Offset}*R=2*|U_{AC2}-U_{AC1}| \quad (9)$$

If Sig1 and Sig2 are two sensor element output signals of the same amplitude which are phase-shifted through 180° with respect to one another $U_{AC}=U_{AC1}=-U_{AC2}$ then the range of values of the offset signal $\Delta I_{Offset}$ in which the comparator element 36 switches is obtained as follows, $U_{AC\_pp}$ being the peak-to-peak value of the sensor element differential signal $U_{Mess}$:

$$\Delta I_{Offset}*R=4*U_{AC}=2*U_{AC\_pp}$$

That is to say that the peak-to-peak value of the signal $U_{Mess}$ can be ascertained as follows:

$$U_{AC\_pp}=(\Delta I_{Offset}*R)/2$$

In an alternative exemplary embodiment, in which one of the internal signals supplied to the comparator element 36, in line with the example Sig1, is a defined reference signal, the amplitude of the sensor element differential signal $U_{Mess}$ is ascertained, since in this case the $U_{AC1}$ term is equal to zero and is therefore omitted.

In additional exemplary embodiments, both in respect of the method for signal offset measurement and in respect of the method for ascertaining the sensor element differential signal, one of the internal signals is a reference signal which has an AC component $U_{AC}$ equal to zero. In line with the example, such a reference signal is produced by the evaluation circuit.

Figure 2:
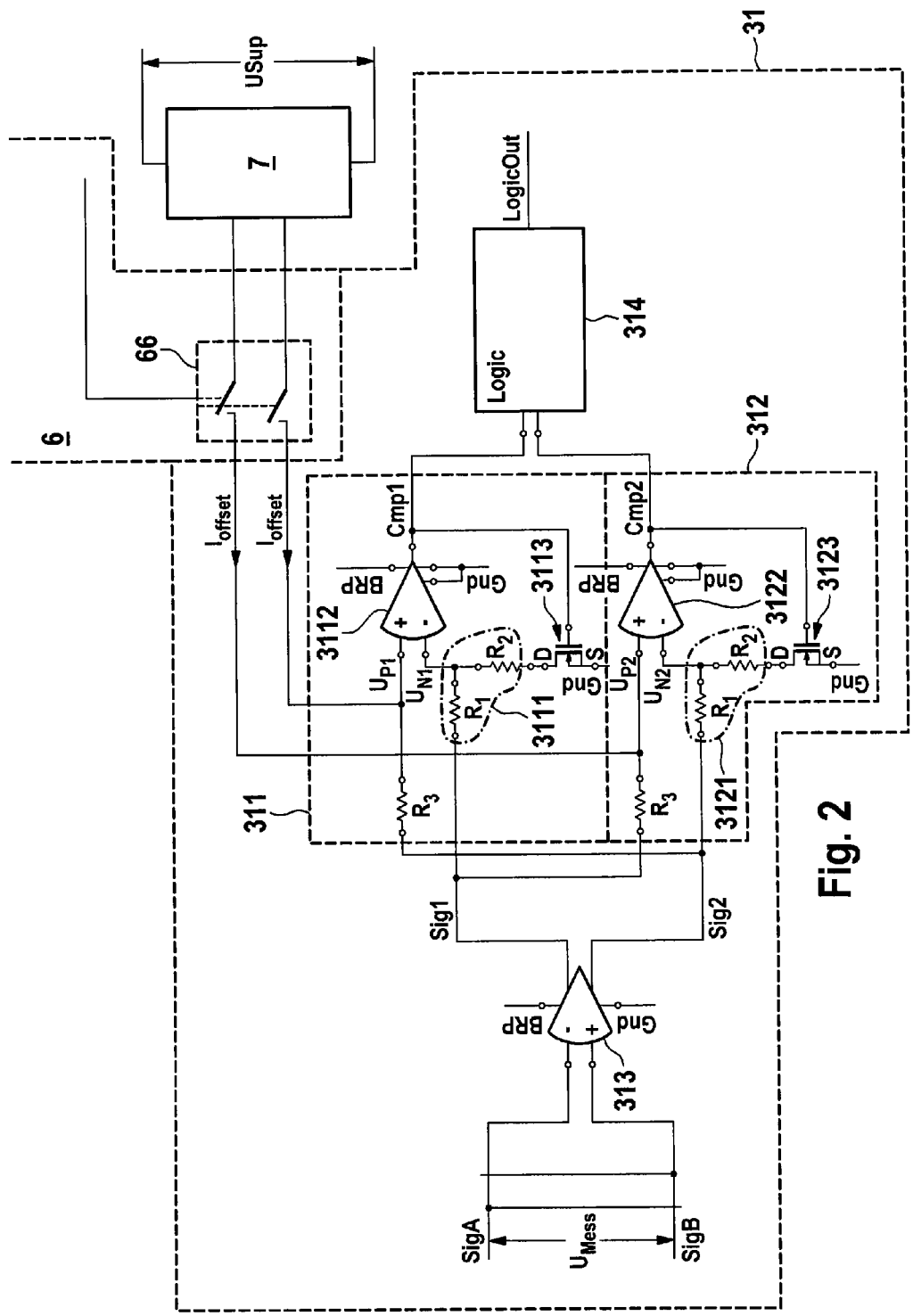
FIG. 2 shows an exemplary embodiment with two comparator elements.

FIG. 2 shows an exemplary signal processing unit 31 of the evaluation circuit. The input side of this signal processing unit 31 has the sensor element output signals SigA and SigB, phase-shifted through 180° with respect to one another, or the voltage difference therein $U_{Mess}$ or the sensor element differential signal $U_{Mess}$ connected to it. The signal processing unit 31 has an amplifier circuit 313 for amplifying these sensor element output signals SigA, SigB. In this case, in line with the example, the amplifier circuit 313 is in the form of an instrument amplifier circuit. In addition, the signal processing unit 31 has two hysteresis circuits 311 and 312 and a logic circuit 314 which, by way of example, has an AND gate—not shown—, the input side of which is connected to the outputs of the hysteresis circuits 311 and 312, and a toggle flip flop, the input side of which is connected to the AND gate. The hysteresis circuits 311 and 312 each comprise a comparator element 3112, 3122, in the form of an operational amplifier, a voltage divider 3111, 3121, each with a first resistor R1 and a second resistor R2, and a transistor 3113, 3123. The operational amplifiers are all jointly connected to the voltage supply for the sensor bridge BRP (Bridge Supply Plus), which is provided by a voltage supply regulation unit—not shown—or a voltage stabilization unit.

Magnetic field sensor elements, such as magnetoresistive sensor elements, have, inter alia, the property that as temperature increases the signal amplitude becomes smaller. It is therefore desirable, when converting from analogue to digital signals, to match the switching hysteresis to the signal voltage by means of the temperature. This is done by means of the hysteresis-determining voltage dividers 3111 and 3121, the two resistors of which are formed from different materials with different temperature coefficients. Appropriate dimensioning can be used to match the temperature dependency of the hysteresis voltage to the temperature dependency of the signal voltage. Furthermore, the signal processing device 31 and the hysteresis circuits 311 and 312 thereof have an asymmetric hysteresis in respect of the two comparator elements 3112, 3122. These comparator elements 3112, 3122 each switch at the zero crossing or the crossing point of the amplitudes of the two output signals of the amplifier circuit 313 Sig1 and Sig2, which results in switching of the two comparator elements 3112 and 3122 independently of the remaining signal profile of these two signals. By way of example, the comparator element 3112 switches whenever there is a change in the polarity of the differential voltage applied to the terminals thereof. If the amplitude of Sig2 (applied to "+" of comparator element 3112) exceeds the amplitude of Sig1 (applied to "−" of comparator element 3112), the output of the comparator element 3112 produces a "1" or a high signal. This "1" turns on the transistor 3113, in this case a MOSFET, whereupon a respective voltage, obtained from the voltage of Sig1 and accordingly the resistance values of the voltage divider 3111, is produced across the resistors R1 and R2. As a result of the MOSFET 3113 being turned on, that terminal of the resistor R2 which is opposite the comparator element has the potential GND applied to it, which is the negative potential of the supply voltage for the magnetic field sensor bridge or the supply voltage regulation unit—not shown. As a result, the potential applied to the inverting input of the comparator element 3112 becomes more negative. For the purpose of changing over the comparator element to a "0" output signal, the rise in the amplitude of Sig1 to the value of the amplitude of Sig2 is accordingly insufficient, because Sig2 is not applied fully to the inverting input of the comparator element 3112 on account of the activated voltage divider. If the temperature of the magnetic field sensor bridge were higher, which results in a generally lower amplitude for the signal Sig1 and Sig2, this hysteresis would result in changeover of the comparator element 3112 occurring significantly later than if the temperature were average or not at all after a particular temperature, because the maximum amplitude difference between Sig2 and the component of Sig1 which is applied to the inverting input of the comparator element 3112 would be lower than the hysteresis threshold. For this reason, the resistors R1 and R2 of the voltage divider have a different temperature coefficient. In this exemplary embodiment, the resistor R1 is designed to be independent of the temperature and the resistor R2 has a positive temperature coefficient in order to compensate for the—in line with the example—negative temperature coefficient of the amplitude profile of the sensor element bridge. As a result, there is a higher voltage across the resistor R2 when the temperature is rising and a proportionally higher potential applied to the inverting input ("−") of the comparator element 3112. This ensures that the amplitude difference between Sig2 and the component of Sig1 which is applied to the inverting input of the comparator element 3112 periodically exceeds the hysteresis threshold even under relatively intense heating. The manner of operation of the hysteresis circuit 312 is correspondent and, in terms of the signals Sig1 and Sig2, inverting in relation to the circuit path of the comparator element 3112. The output signals of the hysteresis circuits 311 and 312 overlap in terms of the high level or the "1" state on account of the hysteresis because the negative edge of one signal comes later than the positive edge of the other signal. The output signal LogicOut obtained for the signal processing device 31 is therefore an essentially square-wave AC signal, the period of which correlates to the speed of movement or rotational speed of the encoder and the edges of which correlate in terms of time to the zero crossings of the input signal.

The noninverting inputs of the comparator elements 3112 and 3122 can now have a respective potential applied to them—in a special mode of operation—which is obtained from the offset signal $I_{Offset}$ through the resistor R3, as a result of which the potentials $U_{P1}$ and $U_{P2}$ are obtained at the two noninverting inputs from the overlaying of this offset potential with Sig2 and Sig1, respectively. The offset current signals $I_{Offset}$ are produced by the electric offset source 7, which is connected to the supply voltage USup of the sensor and, in line with the example, is in the form of a double voltage-controlled current source. When the sensor is changed over to a special mode of operation, the offset source 7 is connected to the evaluation circuit or the signal processing device 31 by means of an offset circuit 66 of a changeover module 6, and it is isolated therefrom in the normal mode of operation.

The sensor element output signals SigA, SigB each have a DC component $U_{DC}$, a signal offset $U_{Offset}$, which is present in line with the example and which is split symmetrically over both signals, since only the difference therein is considered, and, in the event of the sensor sensing a magnetic encoder moving relative thereto, an AC component $U_{AC}$:

$$SigA = +-U_{AC} + U_{DC} + U_{Offset}/2 \quad (10)$$

$$SigB = U_{AC} + U_{DC} - U_{Offset}/2 \quad (11)$$

The instrument amplifier circuit 313 amplifies the difference in the input signals SigA and SigB by the gain factor v and the transfer function:

$$U_{Sig1} = -SigA*(v-1)/2 + SigB*(v+1)/2 \quad (12)$$

$$U_{Sig2} = SigA*(v+1)/2 - SigB*(v-1)/2 \quad (13)$$

Equations (10), (11) and (12), (13) result in $$U_{Sig1} = -(-U_{AC}+U_{DC}+U_{Offset}/2)*(v-1)/2+(U_{AC}+U_{DC}-U_{Offset}/2)*(v+1)/2 = v*U_{AC} - v*U_{Offset}/2 + U_{DC} \quad (14)$$

and $$U_{Sig2} = (-U_{AC}+U_{DC}+U_{Offset}/2)*(v+1)/2-(U_{AC}+U_{DC}-U_{Offset}/2)*(v-1)/2 = -v*U_{AC}+v*U_{Offset}/2+U_{DC} \quad (15)$$

Depending on the supply voltage USup for the sensor, the voltage $U_{P1}$ and $U_{P2}$ is set at the respective noninverting inputs of the comparator elements 3112, 3122 by means of the electric offset source 7, which by way of example is in the form of a voltage-controlled, double current source. In this case, the voltages applied to the input side of the first comparator element 3112 are obtained:

$$U_{P1} = U_{Sig2} + I_{Offset}*R_1 = -v*U_{AC} + v*U_{Offset}/2 + U_{DC} + I_{Offset}*R_3$$

and $$U_{N1} = U_{Sig1} = v*U_{AC} - v*U_{Offset}/2 + U_{DC}$$

The differential voltage $U_{Delta1}$ applied to the input side of the first comparator element 3112 is accordingly:

$$U_{Delta1} = U_{P1} - U_{N1} = -2*v*U_{AC} + v*U_{Offset} + I_{Offset}*R_3 \quad (16)$$

Accordingly, the differential voltage $U_{Delta2}$ applied to the second comparator element 3122 is:

$$U_{Delta2} = U_{P2} - U_{N2} = 2*v*U_{AC} - v*U_{Offset} + I_{Offset}*R_3 \quad (17)$$

The first comparator element 3112 switches from "low" to "high" for $U_{Delta} = 0$. That is to say precisely when the following applies:

$$I_{Offset1}*R_3 = 2*v*U_{AC} - v*U_{Offset} \quad (18)$$

An exemplary method for measuring the signal offset of the sensor element does not involve sensing a magnetic encoder moving relative to the sensor. The AC components $U_{AC}$ are thus equal to zero.

In line with the example, the digital logic circuit 314 is designed such that the transition of the comparator element output Cmp1 from low to high prompts a change in the signal processing unit output signal LogicOut from low to high (high to low). Conversely, the change in the comparator element output Cmp2 from low to high results in a change in the signal processing unit output signal LogicOut from high to low.

In this way, it is possible to produce an output signal pulse which is determined by the low-to-high changes in both comparators. Thus, neither of these switching operations involves the hysteresis, or the hysteresis is turned off and is not included in the measurement of the signal offset in line with the example. As a result:

The first comparator element 3112 switches at:

$$I_{Offset1}*R3 = -v*U_{Offset}$$

The second comparator element 3122 switches at:

$$I_{Offset2}*R_3 = +v*U_{Offset}$$

The difference in both necessary offset signals $I_{Offset1}$, $I_{Offset2}$ which is proportional to the difference in two supply voltages USup, corresponds to:

$$\Delta I_{Offset}*R_3 = 2*v*U_{Offset} \Leftrightarrow U_{Offset} = \Delta I_{Offset}*R_3/2/v \quad (19)$$

This offset signal difference $\Delta I_{Offset}$ or the values in the two offset signals $I_{Offset1}$, $I_{Offset2}$ at the respective switching times or the relevant difference in the supply voltage is stored and used for ascertaining the signal offset $U_{Offset}$.

In order to measure the sensor element differential signal $U_{Mess}$ or an amplitude measurement in the sensor element, a magnetic encoder moving relative to the sensor is sensed. In line with the example, this involves taking account of a signal offset which has already been ascertained previously, this signal offset being set equal to zero in the subsequent calculation of the sensor element differential signal for the purpose of simplification, since it is already known as a constant value.

The two comparator elements 3112, 3122 switch for as long as the input signals thereof "intersect" or the values thereof alternate in respect of the greater-than/less-than ratio over the course of time or while the difference in the values of the signals which are applied to the inputs of the comparator elements 3112, 3122 alternate in respect of the arithmetic sign.

Since the change from "low" to "high" at the output of the respective comparator element switches on the hysteresis in line with the example and therefore the negative input is additionally reduced, the offset adjustment range in which the output switches is reduced by the very value of the hysteresis $U_{Hyst}$.

The offset signal $I_{Offset}$ is altered from a defined negative value to a defined positive value within a defined time.

In this case, the following applies for the offset signal in the negative value range:

$I_{Offset} < 0$:

$U_{P1} < U_{N1} \rightarrow$ hysteresis is off, $U_P$ rises with rising $I_{Offset}$ until $U_{Delta} = 0$.

$$U_{P1} = -v^*U_{AC} + U_{DC} - U_{Offset\_low}^*R_3$$

$$U_{N1} = U_{sig1} = v^*U_{AC} + U_{DC}$$

$$U_{P1} = U_{N1} \Leftrightarrow I_{Offset\_low}^*R_3 = 2^*v^*U_{AC}$$

In this case, in line with the example, the comparator element 3112 starts to switch at the above value of the offset signal $I_{Offset\_low}$.

For the offset signal $I_{Offset}$ in the positive value range, the following applies:

$I_{Offset} > 0$ $U_{P1} > U_{N1} \rightarrow$ hysteresis is on, $U_P$ rises further with rising offset until $U_{Delta}$ can no longer become zero, or only just becomes zero.

$$U_{P1} = -v^*U_{AC} + U_{DC} + I_{Offset\_High}^*R_3$$

$$U_{N1} = U_{Sig1} - U_{Hyst} = v^*U_{AC} + U_{DC} - U_{Hyst}$$

$$U_{P1} = U_{N1} \Leftrightarrow I_{Offset\_High}^*R_3 = 2^*v^*U_{AC} - U_{Hyst}$$

In this case, the comparator element 3112 stops switching at the above value of the offset signal $I_{Offset\_High}$.

This results in the sensor element differential signal $U_{Mess}$, which is the same as the peak-to-peak AC component $U_{AC\_pp}$, as follows:

$$I_{Offset\_High} - I_{Offset\_low} = \Delta I_{Offset} = (4^*v^*U_{AC} - U_{Hyst})/R_3 =$$
$$(2^*v^*U_{AC\_pp} - U_{Hyst})/R_3 \Leftrightarrow U_{AC\_pp} =$$
$$(\Delta I_{Offset}^*R_3 + U_{Hyst})/2/v = U_{Mess} \quad (20)$$

Figure 4:
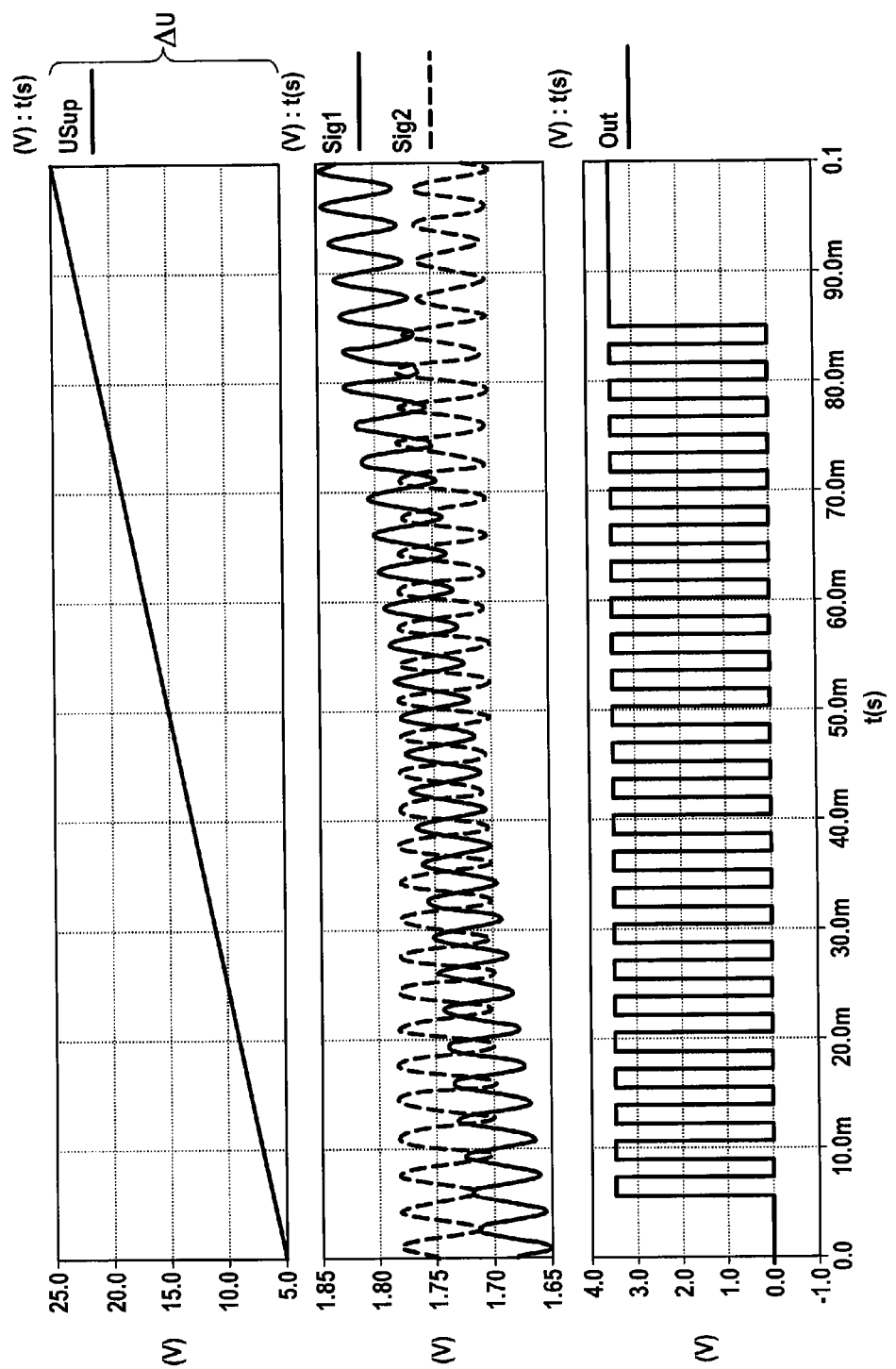
FIG. 4 shows exemplary signal profiles for determining the sensor element differential signal or the bridge amplitude on the basis of the air gap length between sensor and encoder.

FIG. 4 and FIG. 2 shed light on the exemplary method for determining the sensor element differential signal $U_{Mess}$ or the signal amplitude of the sensor element when sensing encoder movements, to which sensor element the sensor is coupled magnetically, in line with the example, via an air gap. In order to ensure that the evaluation circuit and all further components of the sensor are supplied with sufficiently high voltage, the operating voltage range or the supply voltage range in the special mode of operation or test mode is stipulated at 5V to 25V.

The supply voltage USup which controls the offset source and on which the value of the offset signal is directly dependent can be used to displace the potentials of the already amplified sensor element output signals $U_{Sig1}$ or Sig1 and $U_{sig2}$ or Sig2 with respect to one another such that one signal is larger than the other, regardless of the time profile within at least one period of the respective signal, resulting from the sensed encoder movement, wherein this period corresponds, in line with the example, to a magnetic north/south pole pair in the case of an alternately magnetized encoder or alternatively to a tooth-gap pair in the case of a cog-like, ferromagnetic encoder. In other words, both sensor element output signals Sig1, Sig2 "cross" or "intersect" no longer after a defined minimum offset voltage at one of the comparator element inputs.

In the example shown, the offset source has been dimensioned or set such that for a supply voltage USup of 15V the offset voltage produced by the offset signal is 0V. For 5V supply voltage, the offset voltage is −100 mV, and for a 25V supply voltage, it is accordingly +100 mV.

The relationship between the offset signal $I_{offset}$ and the supply voltage USup is represented as follows in line with the example:

$$I_{Offset}^*R_3 = (USup - 15V)^*10 \text{ mV/V}$$

or $$I_{Offset}^*R_3 = \Delta USup^*10 \text{ mV/V} \quad (21)$$

The range in which an output signal change in the digital sensor output signal Out can be detected at the sensor output, that is to say that the sensor output signal has a periodicity and is not constant, is dependent on the already amplified sensor element output signals Sig1 and Sig2 applied to the comparators of the signal processing device and on the hysteresis of the respective hysteresis circuits. The value of the hysteresis of the two hysteresis circuits is determined, in line with the example, by the two resistors $R_1$ and $R_2$, as described in FIG. 2:

$$U_{Hyst} = U_{Sig}^*R2/(R_1 + R_2) - U_{Sig}$$

In this example, the resistor values are chosen to be $R_1 = 1$ k$\Omega$ and $R_2 = 69$ k$\Omega$. For a DC component of $U_{sig}$ at 1.75V, the hysteresis obtained is $U_{Hyst} = 25$ mV. The supply voltage USup for the sensor can be used to calculate the value of the sensor element differential signal $U_{Mess}$ by inserting equation (21) into equation (20):

$$U_{Mess} = U_{AC\_pp} = (\Delta USup^*10 \text{ mV/V} + U_{Hyst})/2/v \quad (22)$$

In the example shown in FIG. 4, an output signal change can be detected for supply voltages USup from 6V to 22V. The gain factor v of the amplifier circuit 313 is v=10 in the example. Using formula (22), a value for the sensor element differential signal $U_{Mess}$ of $U_{Mess} = 9.25$ mV is therefore obtained.

By varying the supply voltage $U_{Sup}$, the example will measure or calculate the amplitude of the sensor element differential signal $U_{Mess}$, which is dependent on the air gap length between encoder and sensor.

Figure 5:
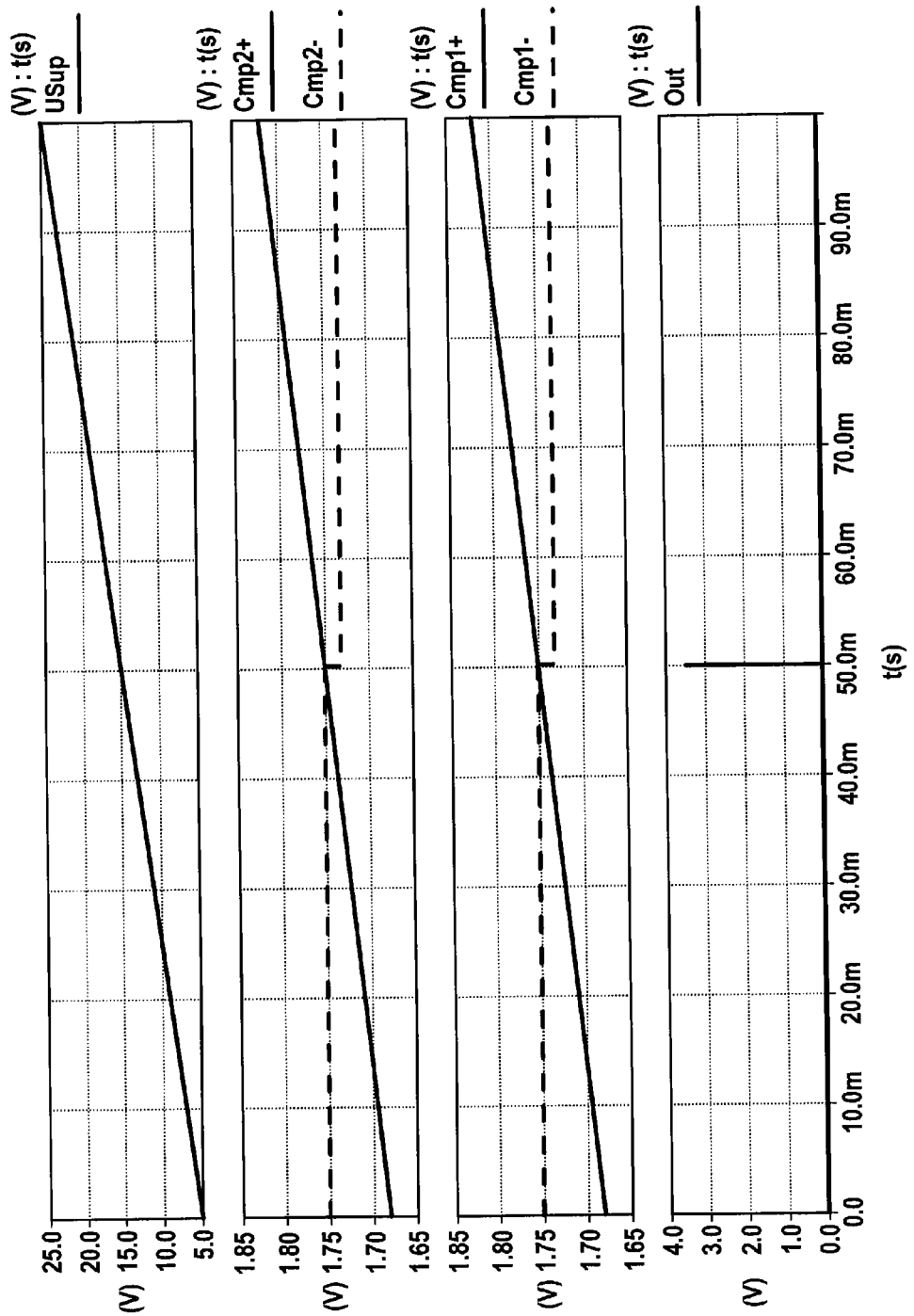
FIGS. 5 and 6 show exemplary signal profiles for determining the offset of the sensor element or the bridge of the sensor element.
Figure 6:
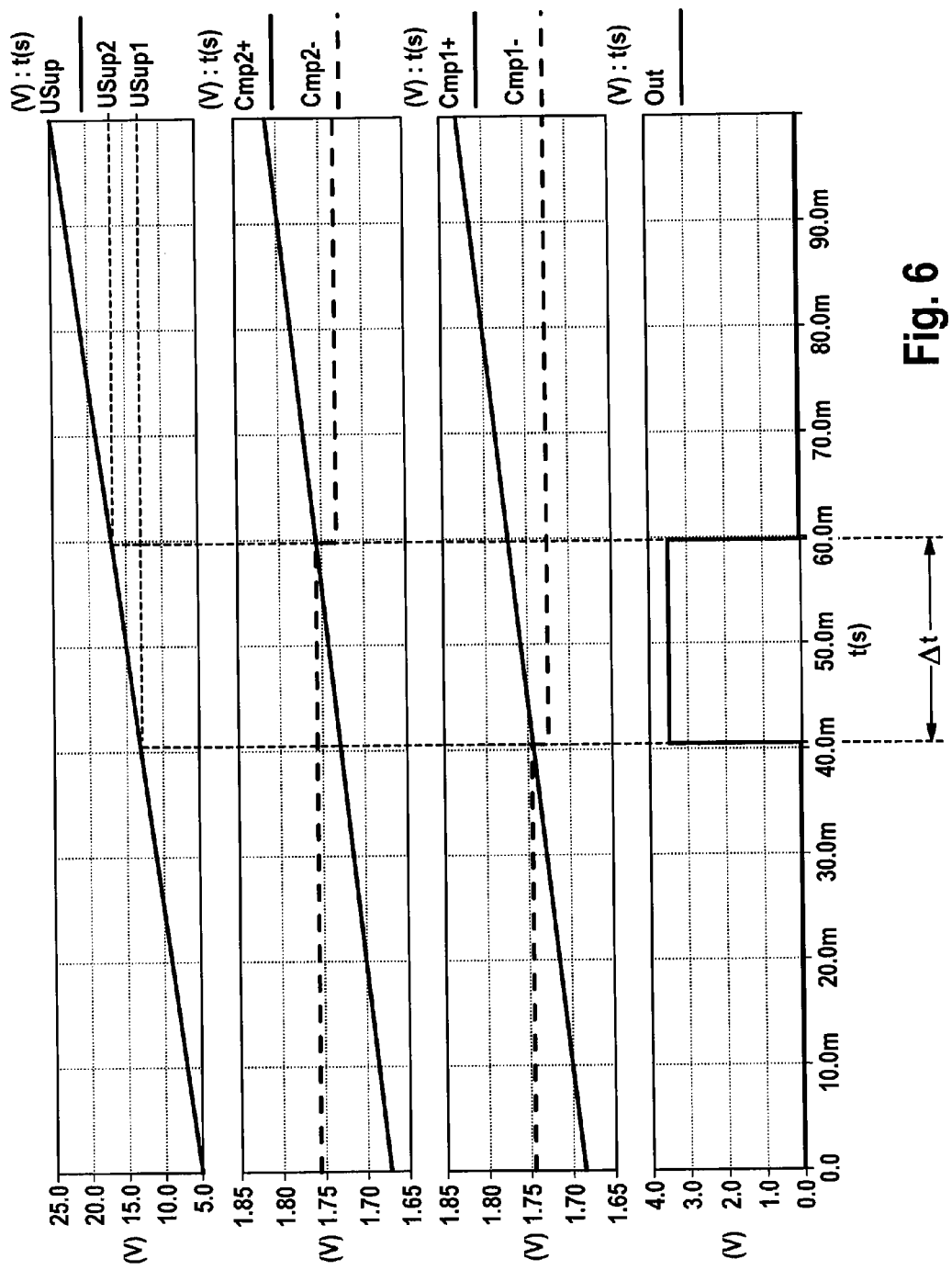

The determination or ascertainment of an offset for the sensor element is explained by way of example with reference to FIGS. 5 and 6. In this case, the example calculates the offset of the measurement bridge of the sensor element.

To this end, as when determining the sensor element differential signal or the amplitude of this signal using the supply voltage USup of the sensor and the electric offset source, the voltage $U_P$ at the noninverting comparator inputs of the evaluation circuit is varied. In this context, the example does not permit an external magnetic field, such as one produced and/or modulated by an encoder, to be sensed by the sensor element.

For the purpose of determining the offset of the sensor element or the bridge offset, the operating voltage range of the supply voltage USup is swept. If the bridge voltage is offset-free, both comparators switch at the same supply voltage, since the two sensor element output signals produce a potential which is of the same magnitude in each case at the comparator inputs. This simultaneous switching of the two comparators can, as illustrated in FIG. 5, be recognized by the peak of the output signal Out. The associated signal profiles of the potentials Cmp2+, Cmp2−, and Cmp1+, Cmp1− applied to the comparator inputs and the profile of the supply voltage USup can likewise be seen from FIG. 5.

If, by contrast, the two sensor element output signals are displaced relative to one another by an offset, both comparators switch at different supply voltages USup1 and USup2. This results in the output signal exhibiting a respective signal change when the first comparator switches and again when the second comparator switches. In this regard, FIG. 6 shows the relevant signal profiles, the signal profiles of the potentials applied to the comparator inputs being denoted by Cmp2+, Cmp2− and Cmp1+, Cmp1−.

The comparator outputs of the evaluation circuit accordingly produce the output signal Out.

The displacement in the switching times of the two comparators in the example from FIG. 6 is a measure of the offset displacement. In line with the example, the two comparator elements in the special mode of operation switch at a supply voltage USup of 13V and 17V, respectively, that is to say a supply voltage difference of $\Delta USup=4V$. The gain of the amplifier circuit 313 can then be used to determine the signal offset of the bridge. If the gain is chosen to be $v=10$, the signal offset $U_{Offset}$ or the offset voltage of the sensor element bridge is obtained as $U_{Offset}=2$ mV in line with the example when the equation (21) is inserted into equation (19).

Figure 3:
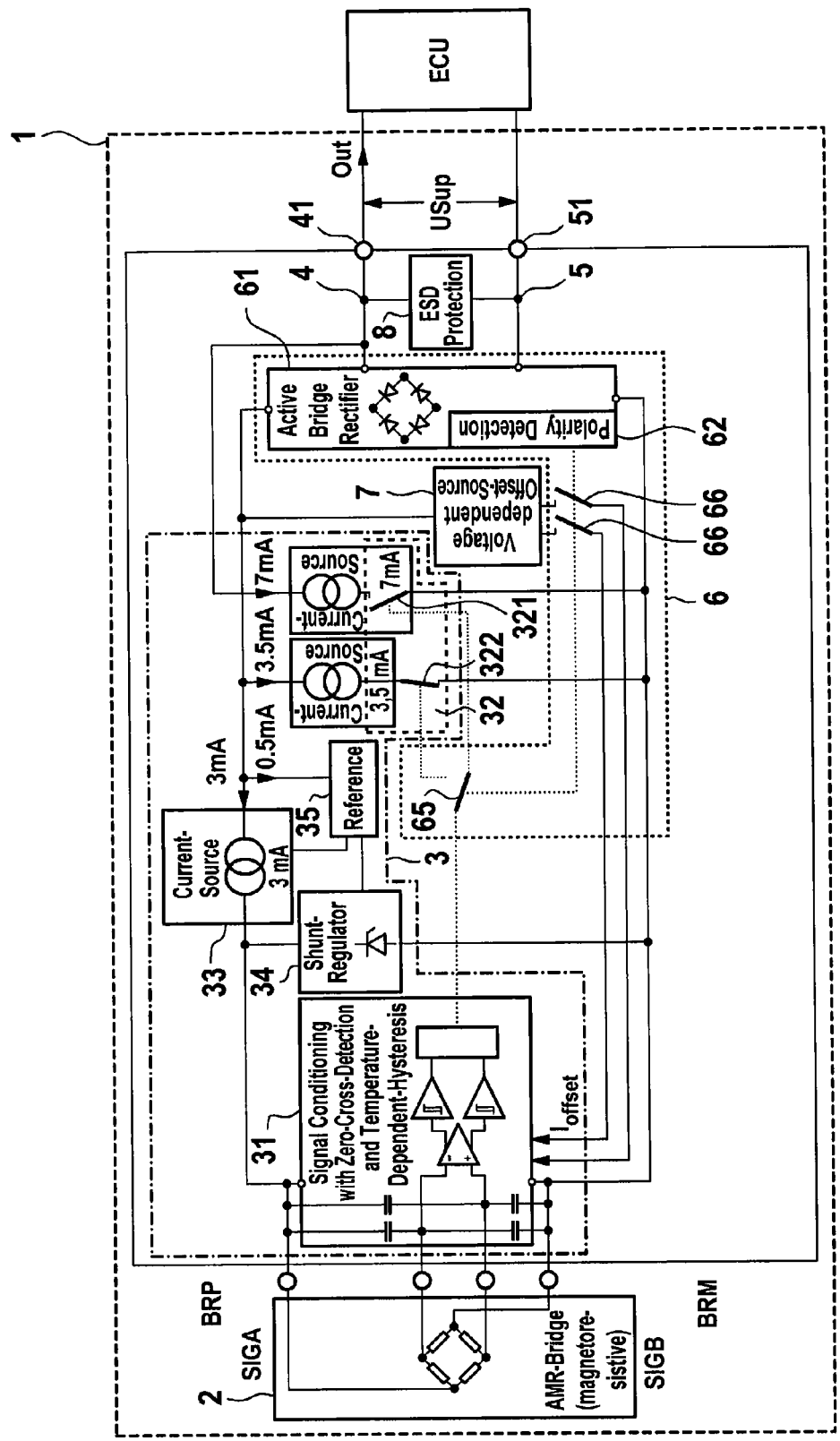
FIG. 3 shows an exemplary wheel speed sensor.

FIG. 3 illustrates an exemplary active sensor 1 which is in the form of a wheel speed sensor and has connecting lines 4 and 5 with the connections 41 and 51, to which additional connecting lines are connected as an extension of the connecting lines 4 and 5. These additional connecting lines connect the active sensor 1 to the electronic control unit ECU of a motor vehicle brake system. The connecting lines 4 and 5 or the connecting lines 4 and 5 extending with the additional connecting lines are used to transmit the sensor output signal Out, and the supply voltage USup is provided on these lines 4, 5. In line with the example, the polarity of the applied supply voltage sets or changes over the mode of operation of the sensor 1. With polarity of "+" on "+" and "−" on "−", the sensor operates in the normal mode of operation. With polarity of "+" on "−" and "−" on "+", the sensor operates in a special mode of operation or—in line with the example—in a test mode operation.

In the normal mode of operation, the sensor output signal Out has a current value in a defined operating current range, whereas in the special mode of operation or test mode of operation, the current value of the sensor output signal Out is in an error band, which means that unintentional polarity reversal can be recognized in normal operation. The active sensor 1 comprises a sensor element 2, which is in the form of an AMR sensor bridge, an evaluation circuit 3 and a changeover module 6. The sensor bridge 2 senses the rotational movements of a magnetic encoder—not shown—which is firmly connected to a wheel, or the magnetic field modulated by the encoder movements. In addition, the sensor 1 has an overvoltage protection unit 8 so that the sensor 1 is not damaged when connected to an excessive voltage. The changeover module 6 for changing over the mode of operation comprises a bridge rectifier circuit 61, a mode comparator 62 and a switch device 65. The mode comparator 62 is connected to the bridge rectifier circuit 61 such that the mode comparator 62 switches or does not switch on the basis of the polarity of the supply voltage of the sensor 1, or senses the polarity of the supply voltage of the sensor 1. The input side of the rectifier circuit 61 is connected to connecting lines 4 and 5 and its output side provides a rectified voltage as a supply voltage for the mode comparator 62, the evaluation circuit 3 and the sensor element 2. In line with the example, the evaluation circuit 3 comprises two current sources which provide a current signal of defined amplitude for an interface circuit 32.

Furthermore, the evaluation circuit 3 comprises a signal processing unit 31 which processes the output signals of the sensor element 2 and produces and outputs a digital AC signal which is modulated in accordance with the encoder movements. In addition, the evaluation circuit 3 has a reference voltage unit 35 which provides the signal processing unit 31, the current source 33 and a voltage stabilization unit 34 with a reference voltage having a defined voltage value. In line with the example, the voltage stabilization unit 34 comprises a zener diode which is used to set the supply voltage of the sensor element 2 and, in line with the example, likewise the supply voltage of the signal processing unit 31, which is connected in parallel therewith, to a constant, defined value. In normal operation, the switch 322 is closed and the switch 321 is operated on the basis of the output signal from the signal processing unit 31. This produces the sensor output signal Out, which changes between 7 mA and 14 mA. In this case, the current value of 7 mA is obtained from the 3 mA from the current source 33, plus the 3.5 mA current source and a further 0.5 mA from other current draws. The current value of 14 mA is then obtained by switching on the 7 mA current source. In a special mode of operation, which is recognized by the mode comparator 62, the output signal of the signal processing unit 31 is rerouted to the switch 322 by means of the switch device 65, against which the switch 321 now remains open. This produces a sensor output signal Out from the sensor 1 which changes between 3.5 mA and 7 mA, and the lower level of 3.5 mA therefore lies in an error band in line with the example, which means that a sensor 1 inadvertently connected with the wrong polarity can be explicitly recognized by the electronic control unit ECU.

In addition, the sensor 1 has an electric offset source 7, the input side of which is connected to connecting lines 4, 5, that is to say that said offset source has the supply voltage USup as a dedicated supply voltage and, in line with the example, is in the form of a voltage-controlled double current source. The two output lines are connected to the signal processing unit 31 of the evaluation circuit 3 via the offset switch 66, which is actuated by the mode comparator 62. In line with the example, this isolates the electric offset source 7 from the evaluation circuit 3 in the normal mode of operation and connects it thereto in the special mode of operation. The electric offset source 7 drives the two offset currents $I_{offset}$.

Figure 7:
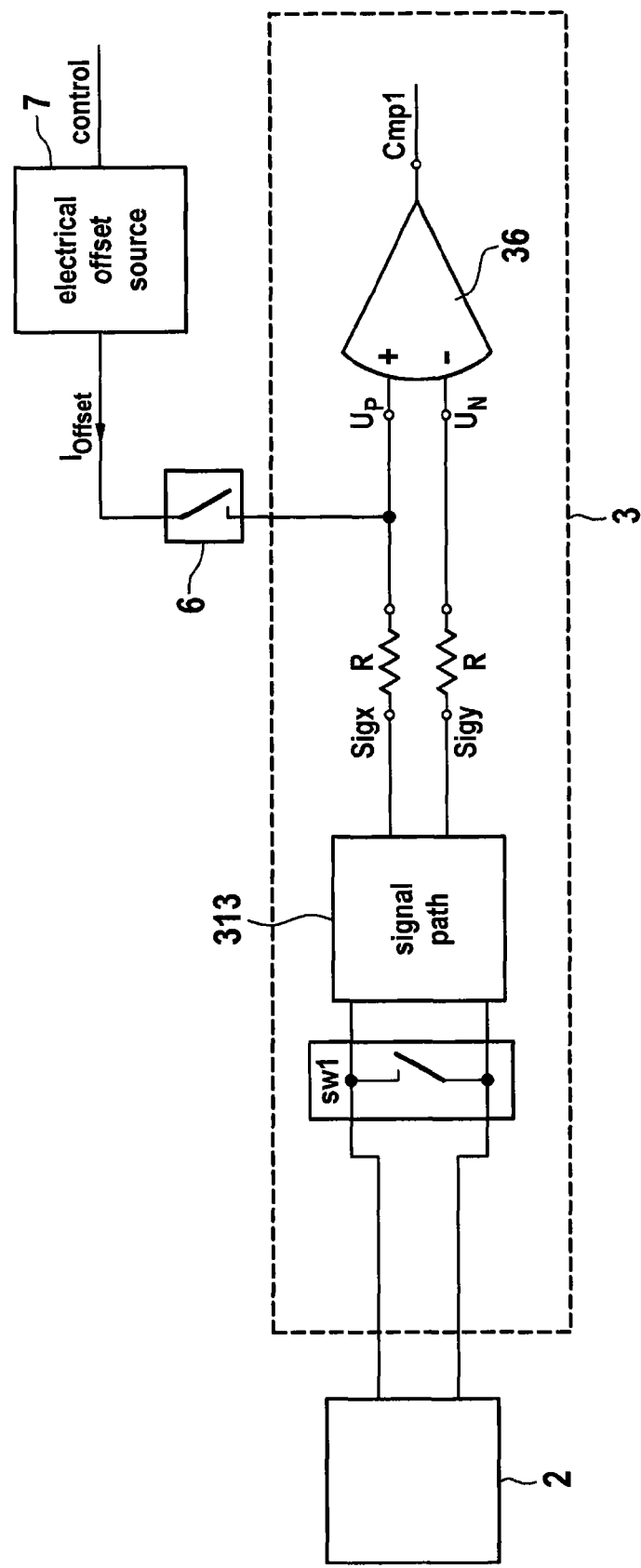
FIG. 7 shows an exemplary embodiment of an evaluation circuit with a selection element.

The exemplary evaluation circuit 3 in FIG. 7 comprises a first comparator element 36, the input side of which has a first internal signal SigX and a second internal signal SigY applied to it, wherein SigX can be overlaid with the offset signal $I_{offset}$ from the offset source 7, which is connected to the evaluation circuit 3 by means of the changeover module 6, in order to ascertain the signal offset between SigX and SigY. The evaluation circuit 3 has a first selection element sw1 which can be used to eliminate the signal offset of the sensor element 2 by closing the switch sw1 and is used to measure only the signal offset caused by the amplifier circuit 313.

The invention claimed is:

1. A method for determining at least one first internal parameter for a sensor having at least one sensor element, an evaluation circuit and a changeover module, wherein the sensor can be changed over between a normal mode of operation and at least one special mode of operation by means of the changeover module and is put into the special mode of operation for the purpose of determining the at least one internal parameter, wherein the sensor has an electric offset source which is used in the special mode of operation to at least partially actuate the evaluation circuit at least for the purpose of determining the first internal parameter.

2. The method of claim 1, wherein the evaluation circuit comprises at least one first comparator element, the inputs of which have a first internal signal and a second internal signal applied to them which have information from the first internal parameter, wherein an offset signal produced by the electric offset source is overlaid on at least one of either the first internal signal or the second internal signal, after which at least the first internal parameter of the sensor is determined directly or indirectly at least from the output signal of the at least one first comparator element.

3. The method of claim 2, wherein the first internal signal is a first sensor element output signal and the second internal signal is a second sensor element output signal or a reference signal, wherein the electric offset source is actuated such that a value of the offset signal produced by the electric offset source is varied in a defined manner or is set to a defined value, as a result of which the first internal parameter of the sensor is determined directly or indirectly at least from a time profile and/or a value of the output signal of the first comparator element.

4. The method of claim 1, wherein the at least one first internal parameter ascertained for the sensor is a signal amplitude of a sensor element differential signal or a value of an internal differential signal or a signal offset of the sensor element, for at least two sensor element components or a sensor element output signal in relation to a reference signal.

5. The method of claim 1, wherein the sensor is in the form of an active sensor and has at least two connecting lines, wherein a supply voltage for the sensor which is applied to the at least two connecting lines is taken as a basis for actuating the electric offset source wherein the signal amplitude of a sensor element differential signal or a signal offset of the sensor element is ascertained from a sensor output signal and/or from the supply voltage applied to the at least two connecting lines in an electronic control unit which is connected to the at least two connecting lines of the sensor.

6. The method of claim 5, wherein the sensor is in the form of an active sensor and has at least two connecting line with a respective connection.

7. The method of claim 3, wherein the first and second sensor element output signals or the first sensor element output signal and the reference signal are supplied to the at least one first comparator element, and the first and second sensor element output signals or the second sensor element output signal and the reference signal are supplied to a second comparator element, wherein values of the first and second sensor output signals supplied to the respective comparator elements are compared with one another directly or indirectly and wherein the offset signal produced by the electric offset source is overlaid on one of either the first or second sensor element output signals supplied at an input of the first comparator element and at an input of the second comparator element.

8. The method of claim 3, wherein for the purpose of ascertaining a signal offset for the sensor element, the offset signal produced by the electric offset source is varied until a first comparator element switches twice or the first comparator element and a second comparator element each switches at least once, after which the offset of the sensor element is determined directly or indirectly from the value of the offset signal at the respective switching times of one or both comparator elements and/or from a difference between the values of the offset signal at switching times and/or from a time interval for the successive switching operations of one or both comparator elements and/or from changes in the offset signal value over time.

9. The method of claim 4, wherein for the purpose of ascertaining the sensor element differential signal, movement of an encoder is captured by the sensor element, wherein a time profile of the signal amplitudes of a first and/or second sensor element output signal is respectively dependent on the relative speed of movement of the encoder in relation to the sensor and, in particular with periodic alternation, the signal amplitude of one either the first and/or second sensor element output signal is larger than the signal amplitude of the other sensor element output signal, and wherein the offset signal produced by the electric offset source is varied or is set in a defined manner.

10. The method of claim 9 wherein the movement of the encoder is captured in periodic alternation.

11. The method as claimed in claim 8, wherein the offset signal is varied until the output signal of the first and/or of another comparator element remains constant or the first and/or the second comparator element starts and/or stops switching, or in that the offset signal produced by the offset source is varied within a defined value range, after which a sensor element differential signal is calculated at least on the basis of a value of the offset signal at which the first and/or the second comparator element starts and/or stops switching.

12. The method of claim 11, wherein the offset signal is varied continually.

13. The method of claim 8, wherein the signal offset of the sensor element is ascertained and then a sensor element differential signal wherein the signal offset of the sensor element is taken into account in the course of calculation of the sensor element differential signal.

14. A sensor for determining at least one first internal parameter, wherein the sensor is capable of carrying out the method as claimed in claim 1, wherein the sensor comprises at least one sensor element, an evaluation circuit and a changeover module which is capable of changing the sensor between a normal mode of operation and at least one special mode of operation; wherein the sensor has an electric offset source which is connected directly or indirectly to the evaluation circuit at least for the purpose of determining the first internal parameter.

15. The sensor of claim 14, wherein the evaluation circuit comprises at least one first comparator element, the inputs of which have at least one first and one second internal signal applied to them, wherein the internal signals comprise information from the at least first internal parameter and wherein the line for at least one of the first and second internal signals is connected directly or indirectly to the electric offset source.

16. The sensor of claim 15, wherein the first internal signal is a first sensor element output signal and the second internal signal is a reference signal or a second sensor element output signal.

17. The sensor of claim 14, wherein the electric offset source is connected to the evaluation circuit by means of the changeover module.

18. The sensor of claim 14, wherein the sensor has at least two connecting lines and is supplied with electric power via the two connecting lines, wherein the sensor has a voltage supply regulation unit which provides a supply voltage which is regulated to a defined voltage value, and at least the sensor element and at least portions of the evaluation circuit are connected to the voltage supply regulation unit.

19. The sensor of claim 14, wherein the evaluation circuit comprises at least two comparator elements, wherein one of the inputs of each of the at least two comparator elements has the electric offset source connected via the changeover module.

20. The sensor of claim 19, wherein the evaluation circuit comprises two hysteresis circuits wherein a first and a second sensor element output signal of the at least one sensor element are processed, wherein the two hysteresis circuits are connected in parallel and the first hysteresis circuit comprises the first comparator element and the second hysteresis circuit comprises the second comparator element, wherein the inputs of the first and second comparator elements have the first sensor element output signal and the second sensor element output signal or one of the two sensor element output signals and a reference signal applied to them and wherein the input signals of the first and second comparator elements are applied the other way around in respect to the noninverting and the inverting input, and a respective input of the respective comparator element, is linked to the electric offset source via the changeover module.

21. The sensor of claim 20 wherein the noninverting input of the respective comparator element is linked to the electric offset source via the changeover module.

22. The sensor of claim 14, wherein the evaluation circuit comprises an interface circuit for setting a defined output signal of the sensors, and the interface circuit is actuated on the basis of the respective mode of operation.

23. The sensor of claim 15, wherein at least the first comparator element has an output connected to a digital output circuit which comprises at least one current source and produces the sensor output signal as a digital current signal.

24. The sensor of claim 14, wherein the evaluation circuit has at least one first selection element in the form of a switch.

25. The sensor of claim 24, wherein the first selection element is in a form and connected such that it can connect together at least two input signal lines of the evaluation circuit or two internal signal lines at two defined points within the evaluation circuit, which allows a value of an internal differential signal to be determined, on the basis of the portions of the evaluation circuit which are situated in the respective signal path between the first selection element and the first comparator element.

26. The use of the sensor of claim 14 in motor vehicles.

27. The use of the sensor of claim 14 as a wheel speed sensor in motor vehicles.

* * * * *